Nov. 17, 1970 JAMES E. WEBB 3,541,250
ADMINISTRATOR OF THE NATIONAL AERONAUTICS
AND SPACE ADMINISTRATION
TELEVISION SIGNAL PROCESSING SYSTEM
Filed Dec. 19, 1967 3 Sheets-Sheet 1

INVENTOR.
ROBERT Y. WONG
BY
ATTORNEYS

INVENTOR.
ROBERT Y. WONG
BY [signature]
ATTORNEYS

INVENTOR.
ROBERT Y. WONG
BY
ATTORNEYS

United States Patent Office 3,541,250

Patented Nov. 17, 1970

3,541,250

TELEVISION SIGNAL PROCESSING SYSTEM

James E. Webb, Administrator of the National Aeronautics and Space Administration, with respect to an invention of Robert Y. Wong, Monterey Park, Calif.

Filed Dec. 19, 1967, Ser. No. 691,737

Int. Cl. H04n 5/20

U.S. Cl. 178—7.1 8 Claims

ABSTRACT OF THE DISCLOSURE

A system for converting video signals from a camera to digital outputs indicating brightness levels, comprising a circuit for sampling the camera AC output and generating a pulse of a length proportional to the peak value of the sample, the pulse length operating a counter with digital output.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to video signals processing systems.

Television or video signals are often generated by a camera delivering an alternating current modulated by the brightness level at points along the camera screen. In some applications, it is necessary to extensively process such signals for transmission to a receiver. For example, in some television systems used on extraterrestrial space probes for transmitting pictures to the earth, the output of the television camera is converted to digital counts indicating brightness levels, which are recorded on magnetic tape for later transmission to the earth.

In some of the systems available heretofore, the AC output of the television camera was demodulated to derive its envelope, and the DC level of the envelope was sampled at regular intervals to control the digital count which indicated brightness level. The demodulation circuitry functioned by utilizing hold circuits for holding the peak level of each AC cycle until the next peak. Due to losses, stray coupling, and other factors, the demodulation circuitry yielded inaccurate envelope values, particularly between AC peaks. The sampling of the envelope was often performed by generating a ramp waveform at regular intervals and noting the time elapsed between the beginning of each ramp and the attainment of a value equal to the derived AC envelope. This often resulted in sampling between AC peaks which resulted in considerable errors, and even if sampling happened to occur at the AC peaks, considerable errors resulted. Furthermore, the circuitry required to demodulate was complex and therefore not of the highest reliability.

OBJECTS AND SUMMARY OF THE INVENTION

Accordingly, one object of this invention is to provide video signal processing circuitry which enables more accurate sampling of video brightness levels than has been generally achieved with circuitry available heretofore.

Another object is to provide video processing equipment which is simpler and more reliable than equipment available heretofore.

The present invention provides a television signal processing system for generating digital outputs indicating the peak amplitude of AC signal inputs. The AC signal inputs may be derived from a vidicon tube on which an image has been formed. A chopped electron beam directed on the back of the image-containing screen generates an AC signal which is modulated by the brightness levels of the screen image as the electron beam sweeps the screen. The system of the invention first amplifies the AC output from the vidicon tube. In some applications, it is desired to sample the AC signal at intervals such as every seventh cycle, to reduce the bandwidth required for storage and transmission. Accordingly, one cycle or one-half of one cycle of every seven cycles is passed through a signal selecting gate. The positive part of the cycle is DC restored, that is, the beginning of the half cycle is brought to a zero or reference level, and this half cycle signal is delivered to a converter. The converter converts the peak amplitude of the half cycle to a pulse with a width proportional to the peak amplitude. The output of the converter drives a counter, the length of the pulse determining the number of counts generated for a sample. The output of the counter may be recorded on magnetic tape for later transmission.

The converter which produces a pulse having a width proportional to the peak amplitude of the half cycle sample from the vidicon tube provides a high precision of conversion. The converter utilizes a capacitor, which discharges as the input rises towards its peak. When the half cycle input reaches its peak and starts to decline, the circuitry for carrying the discharge current to the capacitor is turned off, and the capacitor is recharged at a steady rate by a constant current source. The time required for the capacitor to recharge to its initial voltage level is accurately proportional to the peak voltage of the half cycle. The actual peak value of a half cycle from the video camera governs the converter output, rather than an attempted average value between peaks, as occurs when the input to a converter is taken from an envelope of the camera output as in previous systems.

A more complete understanding of the invention can be had by considering the following detailed description and claims when considered in conjunction with the accompanying drawings.

DESCRIPTION OF THE PREFERRED EMBODIMENT

Figure 1:
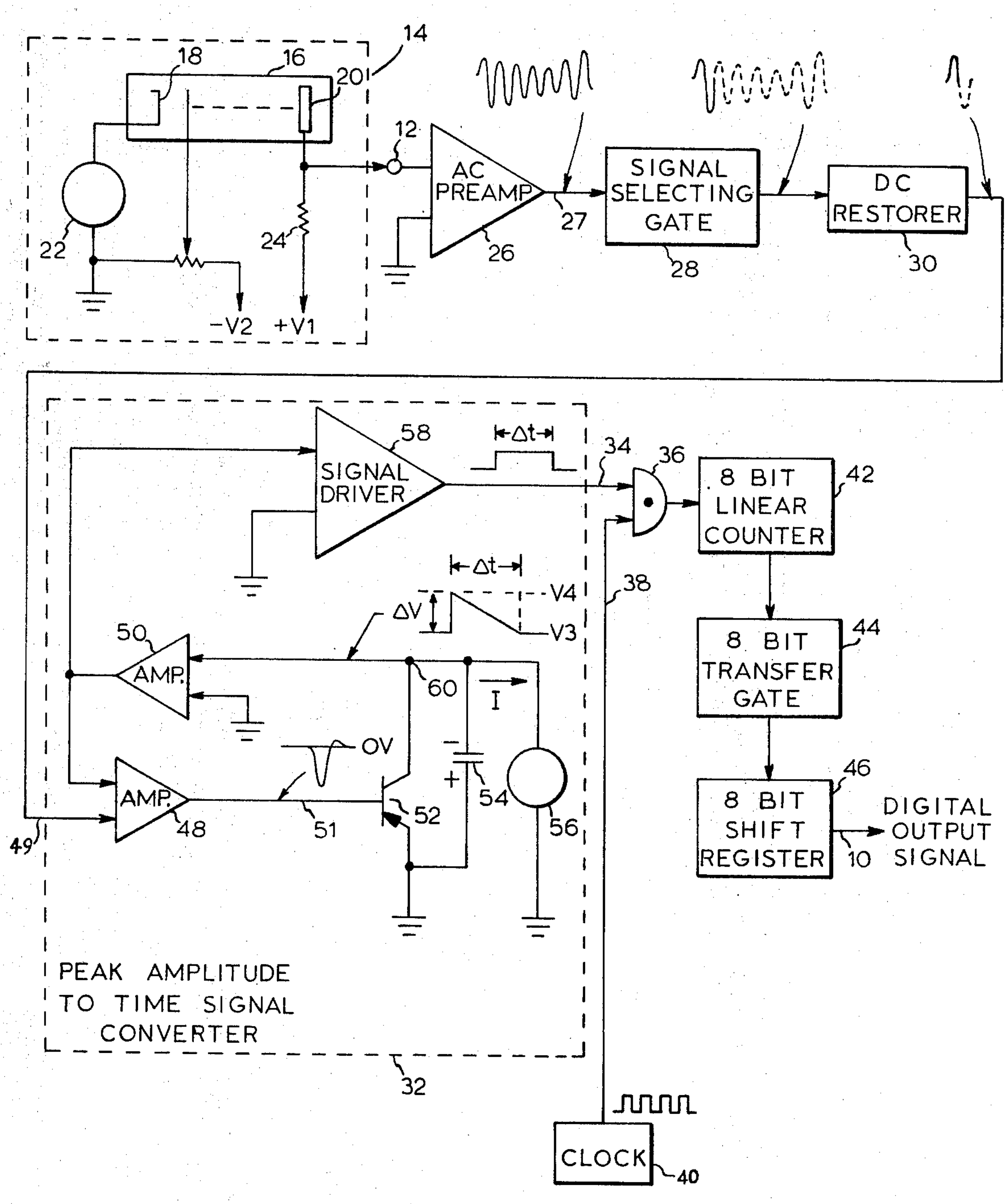
FIG. 1 is a schematic-block diagram of a television signal processing system constructed in accordance with the invention.

FIG. 1 is a schematic diagram of a television signal processing system for generating digital output signals at output 10, of AC video signals received at input 12. The inputs at 12 are alternating current signals with peak-to-peak voltages at each cycle proportional to the image intensity at a point on an image. The signals at input 12 are typically derived from a vidicon camera shown at 14.

The vidicon camera 14 typically includes a picture tube 16 with an electron gun 18 at one end and a screen 20 at the other end. The screen includes a transparent conductive plate and a photoconductive surface upon which an image is focused. The photoconductive surface is charged at each area toward the conductive plate potential to a degree related to its illumination at each area. The electron beam from the gun 18 deposits sufficient electrons to return each area of the photoconductive surface to cathode potential. This creates a current flow in the conductive plate proportional to the image intensity at the area being scanned by the electron beam. A chopper circuit 22 provides alternating current to the electron gun 18 to chop the electron beam so as to obtain a higher signal to noise ratio. The output of the screen 20 is a current which alternates at the frequency of currents from the chopper circuit 22, with a peak-to-peak voltage at each cycle proportional to image intensity at the area being hit by the electron beam. This output is passed through a load resistor 24, and one side of the load resistor is connected to the input 12 of the processing system.

The AC inputs at 12 are first amplified in an AC preamplifier 26. The output of the preamplifier is sampled by a signal selecting gate 28. In many situations, the capacity of the storage or transmitting system which receives the output 10 of the processing system is limited, and it is desirable to sample the video signal at intervals which are as long as possible but which still enable an accurate reconstruction of the television picture, such as after transmission by a space probe to a receiver on earth. Therefore, the signal selecting gate 28 is used to select one cycle of the AC input out of every given number of cycles such as seven. The selected cycles are delivered to a DC restorer circuit 30 which passes one half of the AC cycle, and adds a pedestal to it which starts the half cycle at zero voltage. The output of the DC restorer 30 is delivered to a peak-amplitude-to-time signal converter 32.

The converter 32 produces one pulse at its output 34 for each half cycle input from the DC restorer circuit 30, the duration of the output pulse at 34 being proportional to the peak amplitude of the half cycle input. The pulse at 34 is received by an AND gate 36 to open the gate so long as the pulse exists. A second input 38 to the AND gate 36 is derived from a clock 40 which delivers pulses at a constant rate. These pulses pass through the AND gate 36 during the period when the pulse at 34 exists. The clock pulses passing through the AND gate 36 are counted by a counter circuit 42. At regular intervals equal to the period between samples taken by the signal selecting gate 28, the count in the counter circuit 42 is delivered through a transfer gate 44 to a shift register 46. Immediately after the delivery of the count to the shift register 46, the counter circuit 42 is reset to zero. The output of the shift register 46 is a digital representation of the brightness of the vidicon image at the time a sample is taken by the signal selecting gate 28. An 8-bit binary counter circuit 42 can distinguish 256 different levels of brightness. In one system used in connection with an extraterrestrial space probe, the 8-bit counts from the register 46 are delivered from the output 10 to a tape recorder for later transmission to the earth.

The peak-amplitude-to-time signal converter 32 provides an accurate conversion between the peak amplitude of the half cycle input thereto and the width of the pulse output at 34. As shown in FIG. 1, the converter comprises first amplifier 48, second amplifier 50, a discharging circuit indicated by a transistor 52, a timing capacitor 54, a constant current source 56 and a signal driver 58. The half cycle input to the amplifier 48 causes it to deliver a negative pulse proportional to the positive pulse at its input 49. The negative pulse output of amplifier 48 is delivered to the transistor 52 to turn it on and allow it to discharge the timing capacitor 54, which has been previously charged. The voltage change across the timing capacitor 54 is proportional to the negative peak of the input 51 to the transistor 52. When the input at 51 passes its negative peak and begins to increase, the voltage across the timing capacitor 54 causes the transistor 52 to be cut off so that no current flows therethrough. From the time of cutoff, the timing capacitor 54 begins to be charged by the constant current source 56 from voltage $V_4$ toward voltage $V_3$ (both $V_3$ and $V_4$ are negative with respect to ground, $V_3$ being more negative than $V_4$).

When the voltage across the timing capacitor 54 reaches a level $V_3$, the current through the constant current source 56 is equal to the leakage current through the transistor 52 plus current through the input of amplifier 50, and the voltage across the timing capacitor no longer changes. So long as the voltage at junction 60, which is equal to the voltage across the timing capacitor 54, is greater than $V_3$, amplifier 50 provides a large output. This output is delivered to signal driver 58, causing it to deliver a pulse on its output 34. When the voltage at the junction 60 reaches the level $V_3$, the amplifier 50 no longer delivers a large output and the pulse output of the signal driver 58 drops to a zero level. Thus, the length of the pulse output from signal driver 58 is proportional to the time required for the timing capacitor 54 to charge, negatively, from $V_4$ to $V_3$, which is proportional to the peak amplitude of the input 49 of the AC half cycle.

Figure 2:
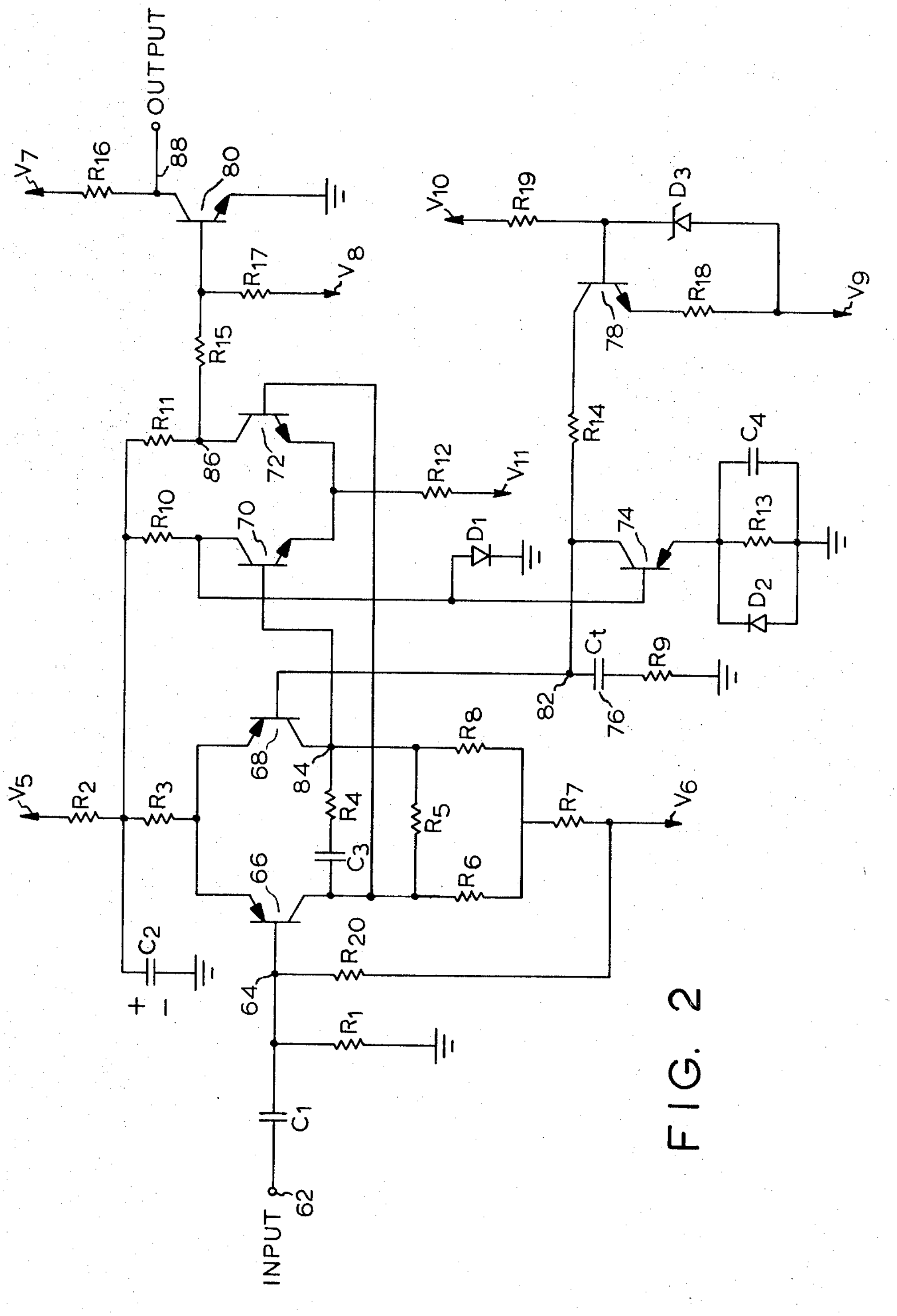
FIG. 2 is a circuit diagram of a peak-amplitude-to-time signal converter of the diagram of FIG. 1.

FIG. 2 is a detailed circuit diagram of the peak-magnitude-to-time signal converter 32 of FIG. 1. The circuit of FIG. 2 includes components corresponding to those in the converter 32 of FIG. 1, with the input 62 corresponding to input 49 in FIG. 1, transsistors 66 and 68 forming an amplifier corresponding to the amplifier 48 in FIG. 1, transistors 70 and 72 forming an amplifier corresponding to the amplifier 50 of FIG. 1, transistor 74 forming a discharge amplifier circuit corresponding to the transistor 52 of FIG. 1, capacitor 76 corresponding to the timing capacitor 54 of FIG. 1, transistor 78 forming a constant current source corresponding to the source 56 of FIG. 1, and transistor 80 forming a signal driver corresponding to the driver 58 of FIG. 1.

In the circuit of FIG. 2, junction 64 receives the half cycle voltage from the DC restorer circuit, and junction 82 has a voltage which changes as much as the voltage at 64 changes while the input at 62 is rising. The amount of current passing through transistor 74 to the timing capacitor 76 to raise its voltage from a fully charged negative value of $V_3$ to a discharge negative value of $V_4$, is dependent upon the peak voltage reached at the junction 64. When the input at 62 reaches its peak and begins to decrease, the transistor 74 is cut off and the timing capacitor 76 is recharged toward its negative voltage $V_3$ by a current of constant amplitude through the transistor 78. The voltage at capacitor terminal 82 drives the transistor 68, thereby controlling the voltage at junction 84, which is the input to the base of transistor 70. This controls the current through transistors 72, and the voltage at junction 86, which is connected to the base of transistor 80, thereby controlling the duration of the pulse at the output 88, which corresponds to the output 34 in FIG. 1.

Figure 3:
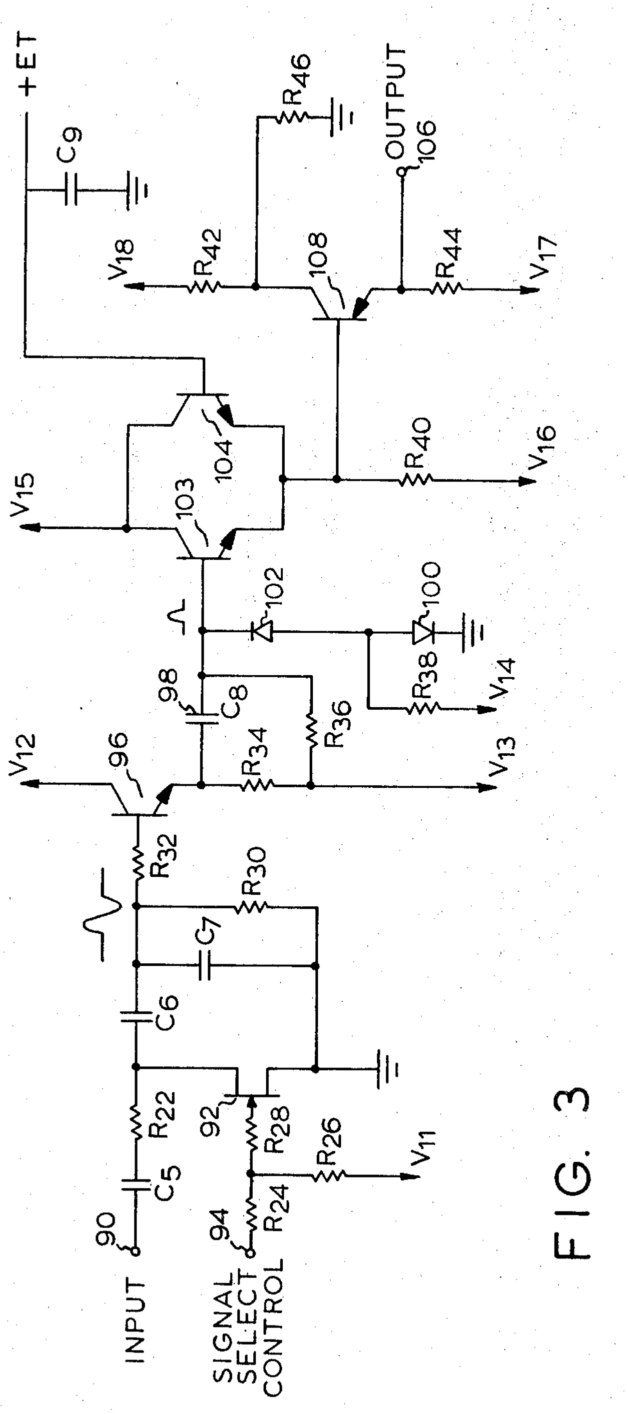
FIG. 3 is a circuit diagram of a signal selecting gate and DC restorer circuit combination of the diagram of FIG. 1.

FIG. 3 is a detailed circuit diagram of a signal selecting gate and DC restorer circuit corresponding to the gate 28 and restorer circuit 30 of FIG. 1. In the circuit of FIG. 3, the input 90 corresponds to the input 27 to the signal selecting gate 28 of FIG. 1. The circuit of FIG. 3 includes a field effect transistor 92 which serves as a signal gate to pass only one out of every seven AC cycles at the input 90. A signal select control input terminal 94 receives signals synchronized with inputs to the chopper circuit 22 of FIG. 1, so that a voltage is received at terminal 94 for six of every seven cycles of the chopper circuit. Accordingly, only every seventh complete cycle of the amplitude modulated signal is passed through the gate, the transistor 92 being on for the remaining time so that the other six cycles of signals are shorted to ground. Transistor 96 serves as an emitter follower having a high input impedance. Diode 102 serves to provide DC restoring, while diode 100 is used for temperature compensation to correct for voltage changes which occur with changes in temperature across diode 102. Transistor 104 is used for establishing a reference level for the half cycle outputs at 106 equal to the output obtained when the vidicon tube views a completely dark scene, obtained by scanning a dark mask placed over the vidicon tube. Transistor 108 provides an emitter following buffer stage.

A television signal processing system has been constructed in accordance with the circuits shown in FIGS. 1, 2 and 3, with the following component value:

TABLE 1.—COMPONENT VALUES FOR FIG. 2

| Component: | | Component value |
|---|---|---|
| $C_1$ | $\mu$f | 0.1 |
| $C_2$ | $\mu$f | 10 |
| $C_3$ | pf | 330 |
| $C_t$ | pf | 9600 |
| $C_4$ | pf | 100 |
| $R_1$ | ohms | 5.62K |
| $R_2$ | do | 1.2K |
| $R_3$ | do | 39.2K |
| $R_4$ | do | 221 |
| $R_5$ | do | 562 |
| $R_6$ | do | 24.3K |
| $R_7$ | do | 1.5K |
| $R_8$ | do | 24.3K |
| $R_9$ | do | 51 |
| $R_{10}$ | do | 31.6K |
| $R_{11}$ | do | 26.7K |
| $R_{12}$ | do | 10K |
| $R_{13}$ | do | 82 |
| $R_{14}$ | do | 270 |
| $R_{15}$ | do | 30K |
| $R_{16}$ | do | 3K |
| $R_{17}$ | do | 220K |
| $R_{18}$ | do | 61.9K |
| $R_{19}$ | do | 1.62K |
| $R_{20}$ | do | 6.19K |
| **66** | type | 2N3350 |
| **68** | do | 2N3350 |
| **70** | do | 2N2920 |
| **72** | do | 2N2920 |
| **80** | do | 2N930 |
| **74** | do | 2N3504 |
| **78** | do | 2N930 |
| $D_1$ | do | 1N916 |
| $D_2$ | do | 1N916 |
| $D_3$ | do.[1] | IN747 |
| $V_5$ | volts | +15 |
| $V_6$ | do | −15 |
| $V_7$ | do | +6 |
| $V_8$ | do | −6 |
| $V_9$ | do | −6 |
| $V_{10}$ | do | +6 |
| $V_{11}$ | do | −15 |

[1] 3.6 v. breakdown.

TABLE 2.—COMPONENT VALUES FOR FIG. 3

| Component: | | Component value |
|---|---|---|
| $C_5$ | $\mu$f | 0.1 |
| $C_6$ | $\mu$f | 0.01 |
| $C_7$ | pf | 47 |
| $C_8$ | $\mu$f | 0.1 |
| $C_9$ | $\mu$f | 0.1 |
| **92** | type | 2N3437 |
| **96** | do | 2N930 |
| **100** | do | 1N916 |
| **102** | do | 1N916 |
| **103** | do | 2N2920 |
| **104** | do | 2N2920 |
| **108** | do | 2N3504 |
| $R_{22}$ | ohms | 30K |
| $R_{24}$ | do | 12K |
| $R_{26}$ | do | 30K |
| $R_{28}$ | do | 1K |
| $R_{30}$ | do | 150K |
| $R_{32}$ | do | 1K |
| $R_{34}$ | do | 15K |
| $R_{36}$ | do | 200K |
| $R_{38}$ | do | 90.9K |
| $R_{40}$ | do | 15K |
| $R_{42}$ | do | 1.2K |

TABLE 2—Continued

| Component: | | Component value |
|---|---|---|
| $R_{44}$ | do | 82.5K |
| $R_{46}$ | do | 1K |
| $V_{11}$ | volts | −6 |
| $V_{12}$ | do | +15 |
| $V_{13}$ | do | −15 |
| $V_{14}$ | do | +40 |
| $V_{15}$ | do | +15 |
| $V_{16}$ | do | −15 |
| $V_{17}$ | do | +40 |
| $V_{18}$ | do | −6 |

The processing system constructed in accordance with the above tables received a carrier signal from the video camera of 20 kHz. carrier frequency which, after amplification by the preamplifier 26, shown in FIG. 1, provided an output 27 ranging from 400 milivolts peak-to-peak to 4.0 volts peak-to-peak. The system provided an 8-bit, 256 level digital word with an accuracy of plus or minus one level over the entire input signal range in operating temperatures of −10° C. to +50° C.

While a particular embodiment of the invention has been illustrated and described, it should be understood that many modifications and variations may be resorted to by those skilled in the art, and the scope of the invention is limited only by a just interpretation of the following claims.

What is claimed is:

1. A signal processing system for generating signal outputs indicating the amplitude of alternating current inputs thereto comprising:

a capacitance;

first means coupled to said capacitance for changing the voltage across said capacitance from a first predetermined level to a second level, in an amount proportional to the peak amplitude of one cycle of an AC input thereto, including means defining a third voltage level, said second level being between said first and third levels, switch means for coupling one side of said capacitor to said means defining a third voltage level, and means for closing said switch means substantially only during an increase in absolute value of a varying input to said switch closing means;

means for carrying at least a portion of said current inputs to said switch closing means;

second means coupled to said capacitance for changing the voltage across said capacitance from said second level toward said first predetermnied level at a substantially constant rate; and pulse means responsive to the voltage across said capacitance for generating a pulse commencing substantially no later than the beginning of the change of voltage across said capacitance from said second level, and terminating at the attainment of approximately said first predetermined level of voltage across said capacitance.

2. A processing system as defined in claim 1 wherein: said means for carrying a portion of said current inputs to said switch closing means includes DC restoring means for generating a pulse containing one half of an AC cycle input thereto with a predetermined pedestal.

3. A processing system as defined in claim 1 wherein: said means for carrying a portion of said current inputs to said switch closing means includes sampling means for sampling a full cycle of continuous AC inputs thereto at regular intervals spaced a plurality of integral numbers of AC cycles apart and DC restoring means coupled to said sampling means for passing only one half of the full cycle sample therefrom and providing a substantially zero pedestal to said half cycle passed therethrough.

4. A signal processing system comprising:
sampling means for generating pulses having peak voltage levels which are proportional to the peak-to-peak voltage of single cycles of AC inputs thereto, as measured from a predetermined reference level;
timing capacitance means;
means defining a predetermined voltage level;
means responsive to said sampling means for connecting said capacitance means to said means defining a predetermined voltage level only during the increase in absolute magnitude of a pulse generated by said sampling means, for changing the voltage across said capacitance means in proportion to the peak voltage output of said sampling means;
charging means for changing the voltage across said capacitance means at a constant rate from the voltage across said capacitance means attained at approximately the peak value of said signal from said sampling means to a final predetermined value; and
pulse generating means for generating a pulse having a duration determined by the duration of charging of said capacitance by said constant charging means.

5. A processing system as defined in claim 4 including:
camera means for generating alternating current signals indicating brightness levels at areas of an image, having an output connected to the input of said sampling means; and
dark current reference means for establishing said reference level of the said pulses generated by said sampling means in accordance with the peak amplitude of AC inputs delivered by said camera means when scanning a dark image area.

6. A processing system as defined in claim 4 wherein:
said sampling means includes means for passing only the portion of whole cycles of AC inputs thereto above a nominally zero reference level, to said means for changing the voltage across said capacitance means.

7. A television signal processing system comprising:
vidicon camera means for generating alternating currents whose peak-to-peak value at every cycle is dependent upon the brightness level of a particular image area;

sampling means coupled to said vidicon camera means for sampling one complete AC cycle out of a plurality of cycles;
DC restorer means coupled to said sampling means for passing the portion of each sampled cycle which is above a nominally zero reference level;
capacitance means;
first amplifying means coupled to said restorer means and said capacitance means for tying the voltage across said capacitance means to the output of said DC restorer means during only the rising portion therefrom;
constant current means for delivering a constant current to said capacitance means from the time a pulse from said DC restorer means begins to decrease from its peak level; and
pulse output means for generating a pulse which begins when the pulse from said DC restorer means begins to decrease from its peak value and which ends when the voltage across said capacitance reaches a predetermined level.

8. A signal processing system as defined in claim 7 including:
dark signal means coupled to said DC restorer means for establishing said nominally zero reference level at the peak level of samples taken when said vidicon camera means is scanning an area of reference brightness.

References Cited

UNITED STATES PATENTS

| | | | |
|---|---|---|---|
| 2,430,139 | 11/1947 | Peterson. | |
| 2,824,287 | 2/1958 | Green et al. | |
| 3,283,320 | 11/1966 | Blachowicz et al. | 307—261 |
| 3,351,873 | 11/1967 | Kimura | 307—235 |
| 3,390,354 | 6/1968 | Munch | 332—1 |

RICHARD MURRAY, Primary Examiner
A. H. EDDLEMAN, Assistant Examiner

U.S. Cl. X.R.

332—9